March 20, 1945.  K. SAITO  2,371,922

VARIABLE SPEED HYDRAULIC COUPLING

Filed March 17, 1941  2 Sheets-Sheet 1

INVENTOR.
K. Saitō
BY
Hascock Downing & Seebold
ATTORNEYS

March 20, 1945.  K. SAITO  2,371,922

VARIABLE SPEED HYDRAULIC COUPLING

Filed March 17, 1941  2 Sheets-Sheet 2

INVENTOR.
K. Saito
BY
Glascock Downing & Seebold
ATTORNEYS.

Patented Mar. 20, 1945

2,371,922

UNITED STATES PATENT OFFICE 2,371,922

VARIABLE SPEED HYDRAULIC COUPLING

Kiitiro Saito, Urudo, Saitama-ken, Japan; vested in the Alien Property Custodian Application March 17, 1941, Serial No. 383,877
In Japan April 5, 1940

3 Claims. (Cl. 60—53)

This invention relates to variable speed hydraulic couplings, and has for its object to provide an improved construction of this class, having eccentric rotary pumps, one of which may be adjusted in eccentricity to control the flow of fluid into the other pump, whereby the latter pump may be controlled in operation.

Figure 1:
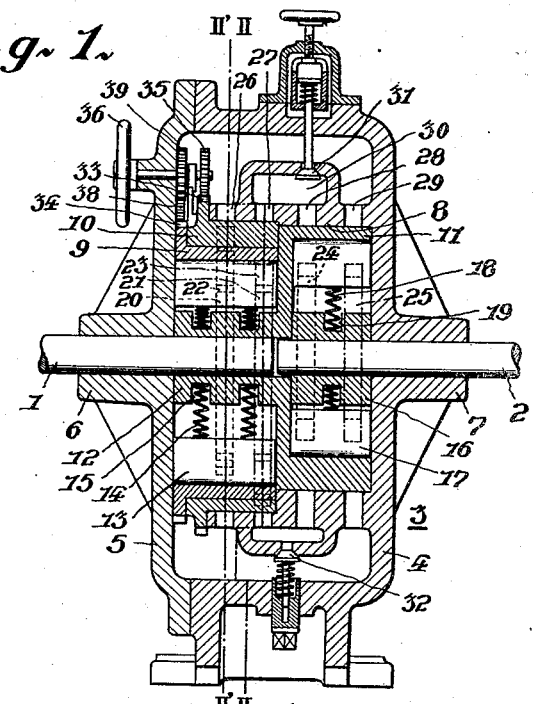
Fig. 1 is a vertical sectional view of a hydraulic coupling embodying the invention.

Referring to the drawings, a driving shaft 1 and a driven shaft 2 extend in an alinement into a closed casing 3, for example, comprising a body 4 and a cover member 5, through in a fluid-tight relation opposite hubs 6 and 7 provided in the cover member and the body respectively. The casing is provided with an internal cylindrical case member 8 integral with or secured to the casing, whereby the casing is divided into inner and outer chambers. A part of the inner wall of the internal cylindrical case member 8 is adapted to receive a cylinder 9 for an eccentric rotary pump associated with the driving shaft 1 in the casing 3, through the intermediary of an adjusting ring 10 whereby the cylinder 9 may be adjusted to position in concentric or in various eccentric relation as desired to the driving shaft 1, while the other part is adapted to receive a cylinder 11 for an eccentric rotary pump associated with the driving shaft 2 in the casing 3.

The driving shaft 1 carries a rotor 12 for the eccentric rotary pump, secured to its inner end in the cylinder 9. The rotor 12 has a smaller diameter than the inner diameter of the cylinder 9, so as to leave a suitable space between the cylinder 9 and the rotor 12, and is provided with a number of radial movable blades 13 supported by means of helical springs 14 in slots 15 provided in the rotor 12 for that purpose.

The cylinder 11 for the eccentric rotary pump associated with the driven shaft 2 may be integral with as shown or secured to the rotator 12 for the eccentric rotary pump associated with the driving shaft 1. The inner circumferential wall of the cylinder 11 is in an eccentric relation to the driven shaft 2, while its external circumferential face is in a concentric relation to said driven shaft.

Similarly to the driving shaft 1, the driven shaft 2 carries a rotor 16 for the eccentric rotary pump secured to its inner end in the cylinder 11. The rotor 16 has a smaller diameter than the inner diameter of the cylinder 11, so as to leave a suitable space between the cylinder 11 and the rotor 16, and is provided with a number of radial movable blades 17 supported by means of helical springs 18 in slots 19 provided in the rotor 16 for that purpose.

The cylinder 9 is provided with ports 20 and 21, the adjusting ring 10 ports 22 and 23 adapted to communicate with the ports 20 and 21 respectively, and the cylinder 11 ports 24 and 25. The internal cylindrical case member 8 is provided with circumferential series of ports 26, 27, 28 and 29 adapted to communicate with the ports 20, 21, 22 and 23 respectively, and is provided with a circumferential annular chamber 30 including the ports 27 and 28. Spring loaded safety valves 31 and 32 are provided for limiting fluid pressure in the outside and the inside of the annular chamber 30 respectively.

For the operation of the adjusting ring 10 and the cylinder 9 to adjust the cylinder 9 in a concentric or various eccentric positions to the driving shaft 1, the adjusting ring 10 is provided with a circumferential flange with teeth 33, the cylinder 9 a circumferential flange with teeth 34. The teeth 33 engaged with a toothed wheel 35 which may be driven by means of a handle 36, and the teeth 34 is drivingly connected through idle wheels 37 and 38 to a toothed wheel 39 which may be driven by means of the said handle, so that the adjusting ring 10 and the cylinder 9 may be moved in a certain relation by means of the handle 36.

All the contacting faces of the parts are made fluid tight, and the space in the casing is filled with suitable fluid, such as oil or water.

Figure 2:
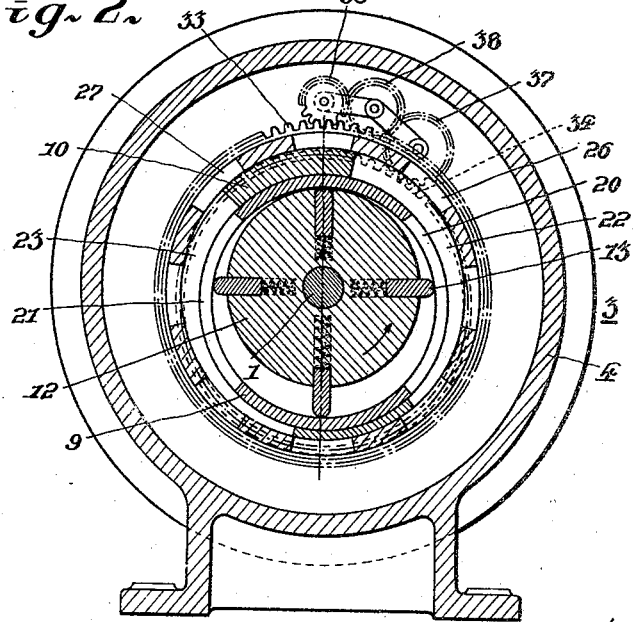
Fig. 2 is a sectional view, the left half taken on the line II—II and the right half taken on the line II'—II' of Fig. 1.

In operation, when the driving shaft 1 and hence the rotor 12 are driven in a direction as indicated by an arrow in Fig. 2, fluid will be admitted from the annular chamber 30 through the ports 27, 23 and 21 into the cylinder 9, and thence the fluid will be forced through the ports 20, 22, and 26 into the space in the casing 3 on the outside of the internal cylindrical case 8, and thence the fluid will be forced through the ports 29 and 25 into the cylinder 11 to drive the rotor 16 and hence the driven shaft 2 in a direction opposite to that of the driving shaft 1, and thence the fluid will be forced through the ports 24 and 28 into the annular chamber 30, the fluid being thus circulated.

In each cycle of the fluid, if the volume of the fluid leaving the cylinder 9 during one complete revolution of the rotor 12 is the same as the volume of the fluid leaving the cylinder 11 during one complete revolution of the rotor 16, the driven shaft 2 will remain still, as the cylinder 11 rotates with the driving shaft 1. In accordance with whether the former volume of the fluid is larger or smaller than the latter volume of the fluid, the driven shaft 2 will be driven in a direction opposite to or the same direction as that of the driving shaft 1. By so making the cylinder 9 that it may contain larger volume of fluid by a suitable volume than the volume of the fluid which may be filled in the cylinder 11, and by the regulation of the volume of the fluid forced from the cylinder 9 into the cylinder 11 by changing the relative position of the cylinder 9 to the rotor 12 by means of the adjusting ring 10, the driven shaft 2 may be driven at variable speed, even smaller or larger than the speed of the driving shaft 1, in a direction opposite to or the same direction as that of the driving shaft 1.

This will be illustrated in detail with reference to Figs. 3-6.

Figure 3:
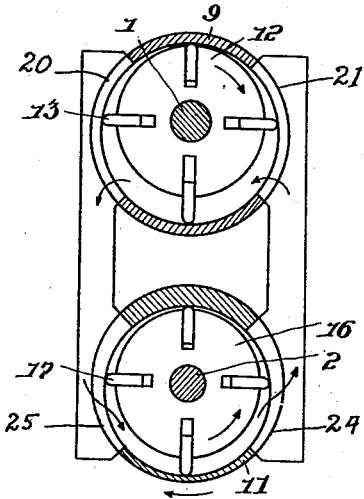
Figs. 3-6 are diagrammatic views illustrating the operative relations between the eccentric rotary pumps on driving and driven sides.

With the cylinder 9 in the relative position to the rotor 12, as shown in Fig. 3, so that the volume of fluid discharged from the cylinder 9, during one complete revolution of the driving shaft 1 is larger than the volume of fluid that can be admitted by cylinder 11, during one complete revolution of cylinder 11 relative to rotor 16, in order to accommodate the difference in volume, rotor 16 must rotate in the direction indicated by the arrow, and hence the driven shaft 2 will be driven in the opposite direction to the direction of the driving shaft 1.

Figure 4:
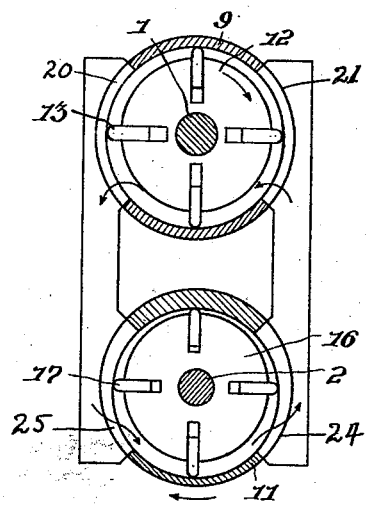

With the cylinder 9 in the relative position to the rotor 12, as shown in Fig. 4, so that the volume of fluid discharged from the cylinder 9, during one complete revolution of the driving shaft 1 is equal to the volume of fluid that can be accommodated by cylinder 11, during one complete revolution of cylinder 11 relative to rotor 16, the driven shaft 2 will remain still, as the cylinder 11 is driven with the shaft 1.

Figure 5:
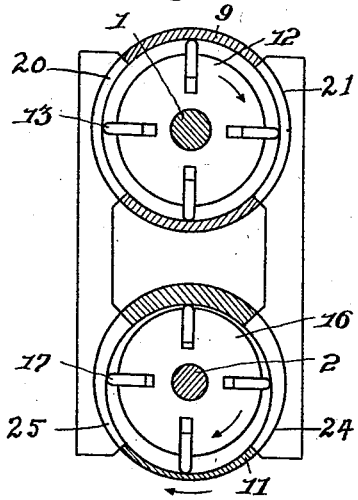

With the cylinder 9 in the relative position to the rotor 12, as shown in Fig. 5, so that no fluid is discharged from the cylinder 9, during rotation of the driving shaft 1 as the cylinder 11 rotates with the rotor 12 on the driving shaft and no fluid can be accommodated at cylinder 9, a fluid lock condition is obtained so that rotor 16 must rotate with cylinder 11. In this case, the driven shaft 2 will be driven in the same direction as the driving shaft 1, the cylinder 9 being concentrically positioned to the rotor 12.

Figure 6:
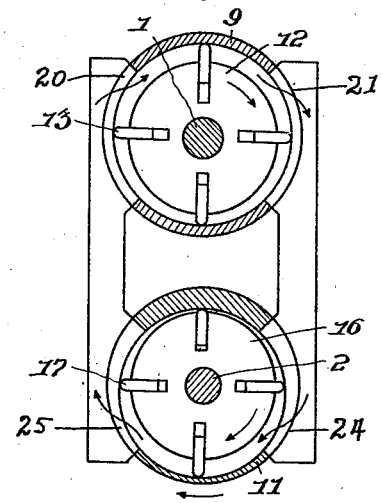

Finally, with the cylinder 9 in the relative position to the rotor 12, as shown in Fig. 6, the fluid will apparently enter in the cylinder 9 through the port 20 instead of the port 21 and discharge through the port 21 instead of the port 20, and will enter into the cylinder 11 through the port 24 instead of the port 25 and discharge through the port 25 instead of the port 24, in the opposite direction to that shown in Fig. 3. Thus, the rotor 16 and hence the driven shaft 2 will be driven in the same direction as the driving shaft 1 and hence the cylinder 11, at a speed greater than shaft 1 in accordance with the volume of fluid discharging from the cylinder 9.

I claim:

1. A variable speed hydraulic coupling comprising a casing, an interior cylindrical case member having a circumferential annular chamber, said internal cylindrical case member being provided with a plurality of ports therethrough which communicate with said annular chamber and with the space between the outside of the internal cylindrical case member and said casing, a driving and driven shaft extending in alinement into the chamber, an eccentric rotary pump comprising a cylinder mounted in a part of the internal cylindrical case member and provided with a series of ports, an adjusting ring on said rotary pump cylinder also provided with a series of ports cooperating with ports of the internal cylindrical case member, means for actuating said ring to adjust said pump as to its relative position to the driving shaft, a rotor secured to the inner end of the driving shaft and having a plurality of radially movable blades, the feed from said pump being variable through the cooperating ports of the cylindrical case member and adjustable ring ports by manipulation of the adjusting means, a second eccentric rotary pump comprising a second cylinder mounted in another part of the internal cylindrical case member, said second cylinder having ports therethrough, a rotor in said second cylinder secured to the driven member and having a number of radially movable blades, the second cylinder being carried by the rotor on the driving shaft, said second cylinder being provided with a plurality of ports which communicate with ports in said internal cylindrical case member.

2. A variable speed hydraulic coupling including an enclosed fluid tight casing provided with aligned apertured hubs for respectively receiving the ends of a driving and a driven shaft, an internal cylindrical case member within the casing and dividing the same into inner and outer chambers, an eccentric rotary pump comprising a cylinder mounted within a part of the case member and surrounding the driving shaft, an adjusting ring interposed between the cylinder and the case member, means coupling the adjusting means to the cylinder to adjust its relative position with respect to the driving shaft, and a rotor arranged within the cylinder, secured to the inner end of the driving shaft and having a number of radially movable blades mounted thereon, and a second eccentric rotary pump in axial alignment with the first mentioned pump comprising a cylinder arranged within the other part of the internal cylindrical case member, surrounding the driven shaft and mounted on the rotor secured to the driving shaft and having its outer circumferential faces concentric with respect to the driving shaft, and a rotor secured to the inner end of the driven shaft and having a number of radially movable blades mounted thereon whereby rotation of the driving shaft is transmitted through the pumps to the driven shaft.

3. A variable speed hydraulic coupling as claimed in claim 2 in which the cylindrical case member is integral with the casing and the cylinder surrounding the driven shaft is integral with the rotor secured to the inner end of the driving shaft.

KIITIRO SAITO.